US005294282A

United States Patent [19]

Rock et al.

[11] Patent Number: 5,294,282

[45] Date of Patent: Mar. 15, 1994

[54] TAPE HANDLING APPARATUS

[75] Inventors: Reinhold Rock, Westlake; Josef Schuessler, Brecksville, both of Ohio

[73] Assignee: Herd Manufacturing, Inc., Cleveland, Ohio

[21] Appl. No.: 686,673

[22] Filed: Apr. 17, 1991

[51] Int. Cl.[5] .................... B32B 31/00

[52] U.S. Cl. .................... 156/516; 156/510; 156/517; 156/518; 226/92; 226/181; 269/21; 269/289 R; 83/451; 83/452

[58] Field of Search .................... 226/92, 181, 115; 156/510, 516, 517, 518, 519, 520, 443; 269/289 R, 21; 83/451

[56] References Cited

U.S. PATENT DOCUMENTS

| | | | |
|---|---|---|---|
| 3,115,999 | 12/1963 | Wythe | 226/115 |
| 3,556,368 | 1/1971 | René226 | 115/ |
| 3,707,422 | 12/1972 | Helm | 156/520 |
| 3,880,692 | 4/1975 | Jeffries | 156/520 |
| 3,902,955 | 9/1975 | West | 156/220 |
| 3,960,646 | 6/1976 | Wiedamann | 156/520 |
| 4,065,044 | 12/1977 | Painter et al. | 226/188 |
| 4,205,835 | 6/1980 | Gerber | 83/451 |
| 4,297,157 | 10/1981 | Van Vliet | 156/520 |
| 4,530,729 | 7/1985 | Fuchs et al. | 156/443 |
| 4,577,791 | 3/1986 | Leinhass | 226/115 |
| 4,650,537 | 3/1987 | Perecman | 156/520 |
| 5,052,606 | 10/1991 | Cipolla et al. | 226/149 |

*Primary Examiner*—Patrick J. Ryan
*Assistant Examiner*—Merrick Dixon
*Attorney, Agent, or Firm*—Tarolli, Sundheim & Covell

[57] ABSTRACT

A gripper assembly grips a double layered end portion of a tape with a tacky side of the tape facing downwardly and a backing side of the tape facing upwardly. A tape feed assembly feeds the tape, with the tacky side down, from a tape storage reel to the gripper assembly at the speed at which the gripper assembly moves along a tape support to tend to minimize tension in the portion of the tape disposed between the tape feed assembly and the gripper assembly. When the desired length of tape has been fed, the tacky side of the tape is moved into engagement with the upper side of the tape support. Suction is applied to the tacky side of the tape to hold the tape in position on the tape support. While the tape is disposed on the tape support, opposite ends of the tape are cut. A tape transfer manifold applies suction to the upwardly facing backing side of the cut tape to grip the tape. Air pressure is applied against the tacky downwardly facing side of the tape to positively release the tape from the tape support. The tape transfer manifold is then moved to a use location where an article receives the tape.

50 Claims, 9 Drawing Sheets

182
186
188

210
242
230
244
244
212
232
216
206
220
224
86
76
222
226
254
200
204
114
164
156
192
190
194

TAPE HANDLING APPARATUS

BACKGROUND OF THE INVENTION

The present invention relates to an apparatus for use in handling tape having a backing side and a tacky side.

A known tape handling apparatus is disclosed in U.S. Pat. No. 4,288,280. This known tape handling apparatus includes a tape feeder having detents which engage an upwardly facing tacky side of a tape. The detents are reciprocated to slide the downwardly facing backing side of the tape along a support surface and onto a tape applying pad. A lubricated cutter is then actuated to cut the tape. Once the tape has been cut, the pad is rotated to press the tape against a workpiece.

Another known tape handling apparatus is disclosed in U.S. Pat. No. 3,237,494. The tape handling apparatus disclosed in this patent is used to form a tear tab in the tape. Other known devices which have been used in the handling of tape or similar material are disclosed in U.S. Pat. Nos. 2,492,593; 2,966,085; and 3,353,432.

SUMMARY OF THE INVENTION

An improved apparatus for use in handling tape having a backing side and a tacky side is operable to cut the tape into predetermined lengths. When a predetermined length of tape is to be removed from a reel or other source of tape, an end portion of the tape is folded back to form a double layered end portion with the backing side of the tape facing both upwardly and downwardly. A gripper assembly grips the double layered end portion of the tape. Since the backing side of the tape faces both upwardly and downwardly at the double layered end portion of the tape, the tape does not stick to the gripper assembly even though the tape is firmly held by the gripper assembly.

The gripper assembly is then moved along a longitudinally extending tape support. As the gripper assembly moves along the tape support, a tape feed assembly feeds tape toward the gripper assembly at the same speed as which the gripper assembly is moved along the tape support. By feeding tape toward the gripper assembly with the tape feed assembly, tension in the portion of the tape between the gripper assembly and the tape feed assembly tends to be minimized.

When a predetermined length of tape has been withdrawn from the source of tape, the gripper assembly is lowered to position the tape on the tape support. Although the tape could be fed and positioned on the tape support with the tacky side up, it is preferred to feed the tape and to position the tape on the tape support with the tacky side down. To hold the tape in place, suction is applied to the downwardly facing tacky side of the tape through openings in the tape support. The tape is then cut to a desired length.

After the tape has been cut to the desired length, an upper gripper or tape transfer manifold is lowered into engagement with the upwardly facing backing side of the tape. Suction is applied to the backing side of the tape through openings formed in the tape transfer manifold. At the same time, fluid pressure is directed against the downwardly facing tacky side of the tape to positively release the tape from the tape support. The tape transfer manifold is then raised and moved to a tape receiving location. At the tape receiving location, the tape transfer manifold either applies the tape directly to an article or releases the tape for subsequent application to a tape receiving article.

Accordingly, it is an object of this invention to provide a new and improved apparatus for use in handling tape having a backing side and a tacky side and wherein the apparatus includes a tape feed assembly for feeding a predetermined length of tape from a source of tape, a cutter to cut the tape to a predetermined length, and a transfer assembly for transferring the tape from the location where the tape is cut.

Another object of this invention is to provide a new and improved apparatus for use in handling tape as set forth in the preceding object and wherein the tape is cut with the tacky side of the tape facing downwardly.

Another object of this invention is to provide a new and improved apparatus as set forth in any of the preceding objects and wherein fluid pressure is applied against the tacky side of the tape to facilitate disengagement of the tape from a tape support.

Another object of this invention is to provide a new and improved apparatus for use in handling tape having a backing side and a tacky side and wherein the apparatus includes a feed assembly for feeding tape from a source of tape and an assembly for moving the tape away from the tape feeding assembly at a speed which is the same as the speed at which the tape is fed by the tape feeding assembly to thereby tend to minimize tension in the tape.

BRIEF DESCRIPTION OF THE DRAWINGS

The foregoing and other objects and features of the invention will become more apparent upon a consideration of the following description taken in connection with the accompanying drawings, wherein.

DESCRIPTION OF A SPECIFIC PREFERRED EMBODIMENT OF THE INVENTION

General Description

Figure 1:
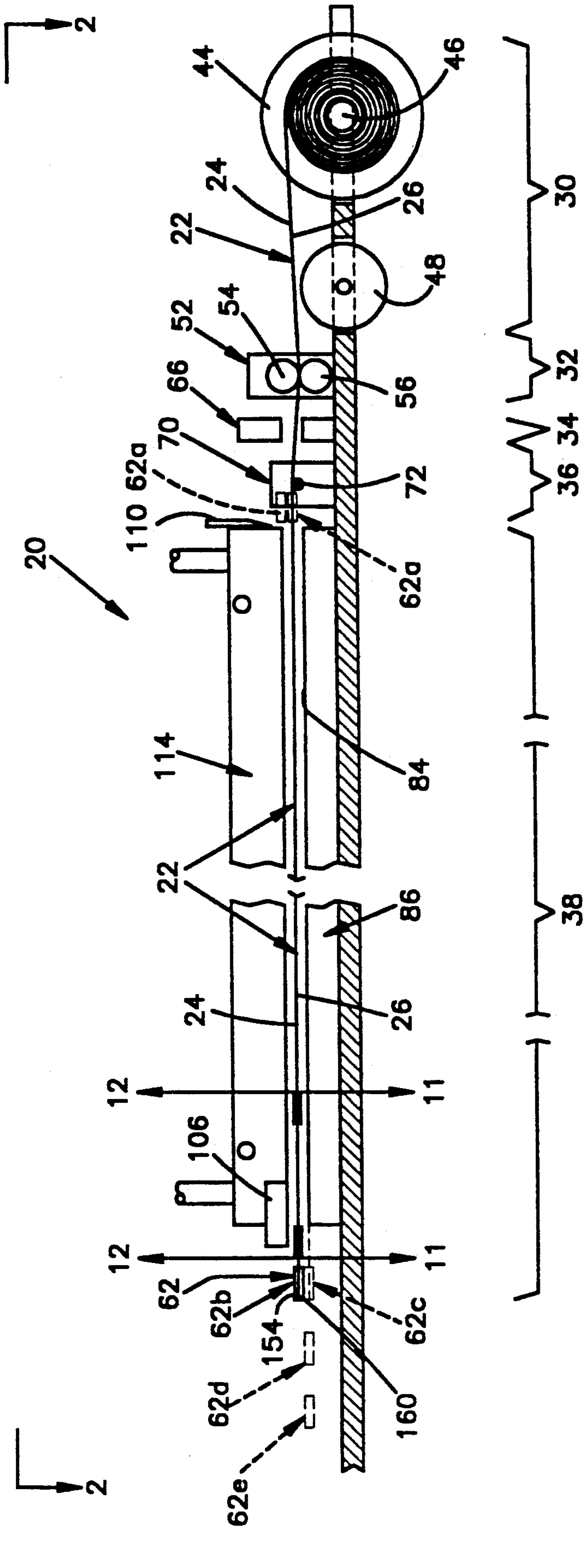
FIG. 1 is a schematic elevational view of a tape handling apparatus constructed in accordance with the present invention.
Figure 7:
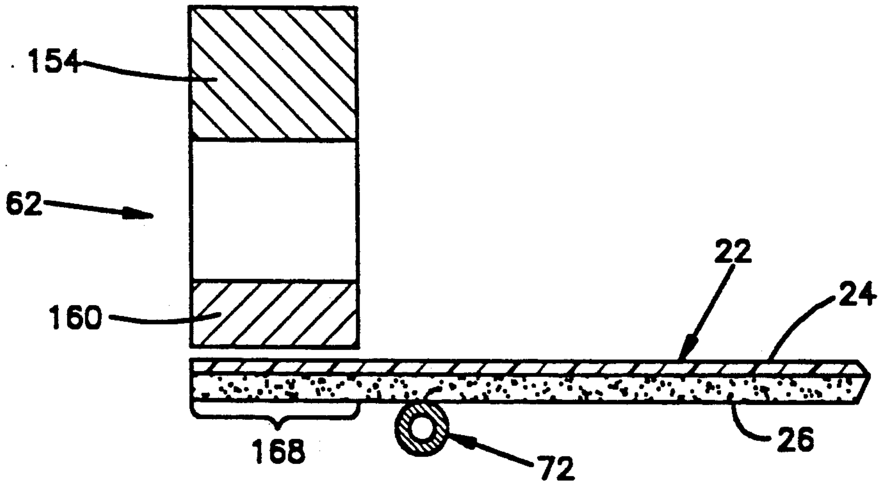
FIG. 7 is a highly schematicized illustration depicting the relationship between the gripper assembly and an end portion of tape to be fed.

An apparatus 20 (FIGS. 1 and 2) is used in handling tape 22 having a backing side 24 and a tacky side 26 (FIGS. 1 and 7). The backing side 24 is formed of a nontacky and smooth layer of polymeric material. The tacky side 26 is formed of an adhesive which adheres to an article when pressed against the article. The backing side 24 may be removed to expose the adhesive during mounting of the article.

The apparatus 20 (FIGS. 1 and 2) includes a tape supply station 30 from which the tape 22 is supplied to a feed station 32. The tape 22 is fed from the feed station 32 to a marking station 34. After being marked, the tape is conducted to a pickup station 36. From the pickup station 36, the tape moves to a delivery and cutting station 38. From the cutting and delivery station 38, a predetermined length of the cut tape 22 is transferred sidewardly to an application station 40 (FIG. 2) which is offset to one side of and extends parallel to the delivery and cutting station 38.

At the tape supply station 30, the tape 22 is stored on a reel 44. The reel 44 is rotatably mounted on an axle shaft 46. An adjustable friction brake (not shown) of known construction is associated with the reel 44 to enable resistance to rotation of the reel to be adjusted.

A guide roll 48, covered with a non-stick material, is rotatably mounted at the tape supply station 30 adjacent to the reel 44. As the amount of tape on the reel 44 decreases, the downwardly facing tacky side 26 of the tape 22 moves into engagement with the guide roll 44 to guide movement of the tape. Although it is preferred to have the tape 22 supplied on the reel 44, it should be understood that other sources of tape could be utilized if desired.

A tape feed assembly 52 is provided at the tape feed station 32. The tape feed assembly 52 pulls tape from the reel 44 and feeds the tape toward the delivery and cutting station 38. Although the tape feed assembly 52 could feed the tape 22 with the tacky side 26 facing upwardly, it is preferred to feed the tape with the tacky side facing downwardly.

The tape feed assembly 52 includes a drive roller 54 which engages the upwardly facing backing side 24 of the tape 22. The tape feed assembly 52 also includes an idler roller 56 (FIG. 1) which engages the downwardly facing tacky side 26 of the tape. The drive roller 54 is knurled to have nonslip engagement with the backing side 24 of the tape 22. The idler roller 56 has a non-stick coating to prevent the adhesive in the tacky said 26 of the tape from adhering to the idler roller.

A stepper motor 58 (FIG. 2) is provided to rotate the drive roll 54 at a surface speed which is equal to the speed at which a lower gripper assembly 62 moves a leading end of the tape through the tape delivery and cutting station 38. By having the drive roller 54 driven at a surface speed which is equal to the speed of movement of the gripper assembly 62, the tension in the portion of the tape 22 disposed between the tape feed assembly 52 and gripper assembly 62 tends to be minimized. Therefore, there is minimal stretching of the tape 22. If the tape 22 is stretched and subsequently applied to a flexible article, the natural resiliency of the tape causes it to tend to bow or bend the article. By eliminating tension in the tape 22 between the gripper assembly 62 and tape feed assembly 52, the tendency for the tape to cause bowing of a flexible article to which the tape is attached is minimized.

The tape marking station 34 is immediately adjacent to the tape feed assembly 52 at the tape feed station 32. A stamp assembly 66 is located at the tape marking station 34. The stamp assembly 66 is operable to stamp a part number or other indicia on the backing side 24 of the tape 22 in a known manner.

After leaving the tape marking station 34, the tape enters the tape pickup station 36. At the tape pickup station 36, the tacky side 26 of a leading end portion of the tape 22 is folded back against the tacky side of an adjacent portion of the tape. This results in the leading end portion of the tape having a double layered construction with the smooth backing side 24 of the tape facing both upwardly and downwardly. Therefore, when the gripper assembly 62 grips the double layered leading end portion of the tape 22, the gripper assembly does not engage the tacky side 26 of the tape. This eliminates any tendency for the tape to stick to the gripper assembly 62 even though the gripper assembly clampingly grips the leading end portion of the tape.

Figure 2:
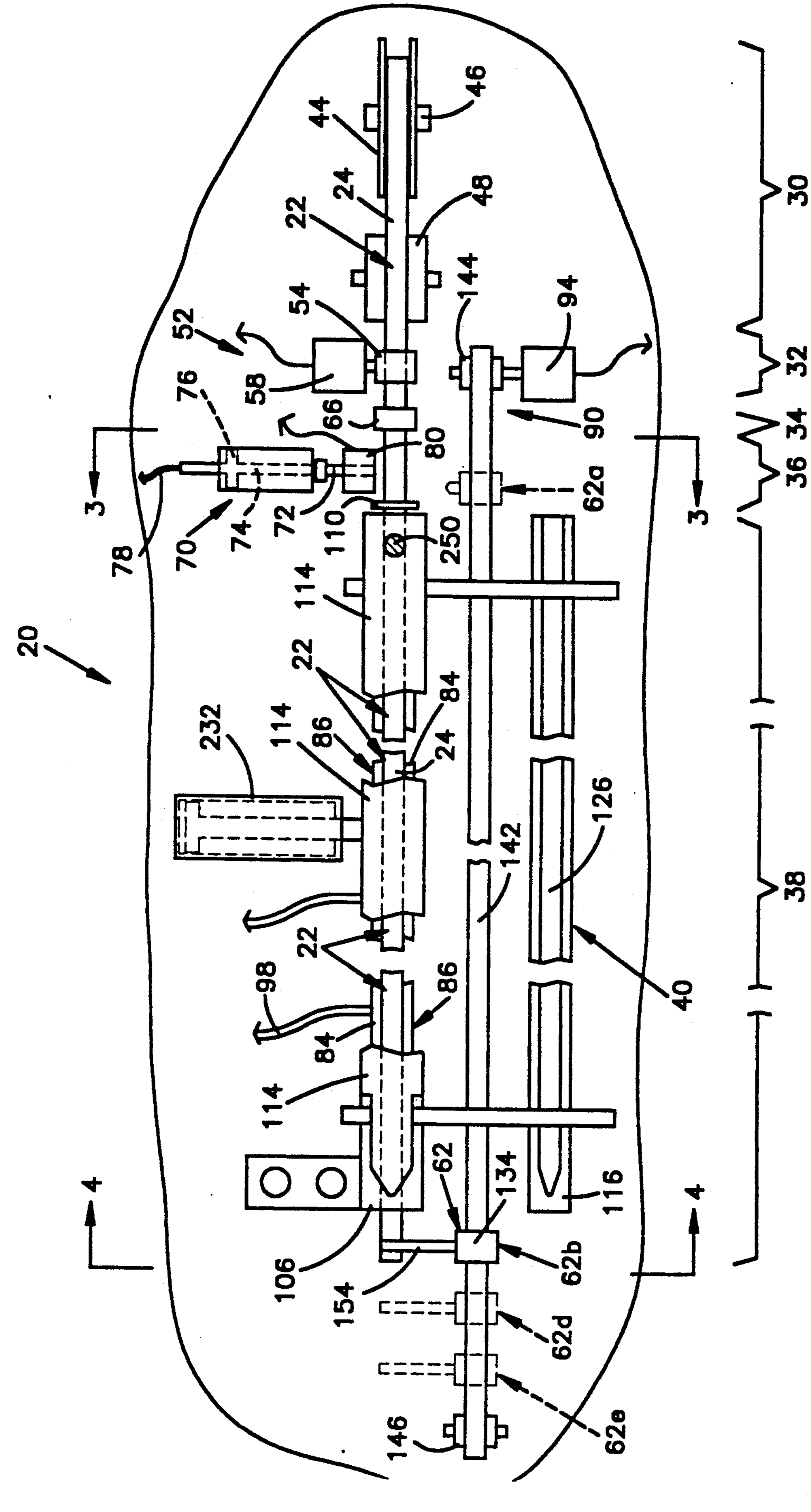
FIG. 2 is schematic plan view, taken generally along the line 2—2 of FIG. 1, further illustrating the construction of the tape handling apparatus, the tape handling apparatus being shown after the tape has been cut to form a predetermined length of tape and prior to transfer of the tape from the cutting location.

A pin assembly 70 cooperates with the gripper assembly 62 in the forming of the double layered leading end portion of the tape 22. The pin assembly 70 includes a longitudinally extending hollow pin or rod 72. One end of the pin 72 is connected to a hollow piston rod 74 which extends through a piston 76 (FIG. 2). The outer end of the piston rod is connected with a conduit 78 connected with a source of oil or lubricant. The oil is conducted through an axial passage in the piston rod 74 to an axial passage in the hollow pin 72.

The oil flows radially outwardly from the axial passage through openings in the side wall of the hollow pin 72 into a cylindrical serrated bushing 80. The serrated bushing 80 supports the pin 72 and enables a coating of oil to be applied to the outer side surface of the pin 72 as the pin is moved from a retracted position (FIG. 2) to an extended position (FIG. 3) in which the pin extends beneath the tacky side 26 of the tape 22. The coating of lubricant on the outside of the pin 72 prevents the tacky side 26 of the tape 22 from sticking to the pin.

The gripper assembly 62 cooperates with the pin 72, in the manner shown in FIGS. 7-10, to form a double layered leading end portion on the tape 22. Once the gripper assembly 62 has gripped the double layered leading end portion of the tape 22 and the pin 72 has been moved to the retracted position of FIG. 2, the gripper assembly 62 is raised upwardly (FIG. 1) to move the double layered leading end portion of the tape 22 well above an upwardly facing side surface 84 of a longitudinally extending tape support or lower manifold 86 at the delivery and cutting station 38.

A gripper drive assembly 90 (FIG. 2) is then operated to move the gripper assembly 62 along the longitudinally extending tape support 86 from an initial position shown in dashed lines at 62*a* in FIG. 1 to an end of feed position shown in solid lines at 62*b* in FIG. 1. As the gripper drive assembly 90 moves the gripper assembly 62 from the initial position to the end of feed position, the tape feed assembly 52 feeds the tape 22 from the reel 44 to the gripper assembly at the same speed as which the gripper assembly is moved along the tape support 86. Thus, the speed of operation of the motor 58 (FIG. 2) for the drive roller 54 in the tape feed assembly 52 is coordinated with the speed of operation of a motor 94 of the tape feed assembly 90. The motors 58 and 94 are operated so that the drive roller 54 is driven at the same surface speed as the speed of movement of the gripper assembly 62 along the longitudinally extending tape support 86. As was previously explained, this minimizes tension in the portion of the tape 22 disposed between the gripper assembly 62 and the tape feed assembly 52.

As the gripper assembly 62 moves along the tape support 86, the gripper assembly 62 is disposed far enough above the upper side surface 84 of the tape support 86 so that the downwardly facing tacky side 26 (FIG. 1) of the tape 22 does not engage the upwardly facing side of the tape support 86. After a predetermined length of tape has been fed from the reel 44, the gripper assembly 62 reaches the end of feed position shown at 62*b* in solid lines in FIG. 1. The gripper assembly 62 is then moved downwardly from the raised position shown at 62*b* to a lowered position shown at 62*c* in FIG. 1.

As the gripper assembly moves downwardly from the raised position 62*b* to the lowered position 62*c*, the downwardly facing tacky side 26 of the tape 22 approaches the upper side surface 84 of the tape support 86. The tape support 86 contains a longitudinally extending manifold chamber (not shown) which is connected with a plurality of openings 102 (FIG. 11) formed in the upper side 84 of the tape support. At this time, a manifold chamber in the tape support 86 is connected in fluid communication with a vacuum pump. Therefore, suction is applied to the downwardly facing tacky side of the tape 22 as the gripper assembly 62 lowers the tape onto the tape support 86. The suction applied to the lower tacky side 26 of the tape 22 pulls the tape into position on the tape support 86 and holds the tape in place.

Figure 11:
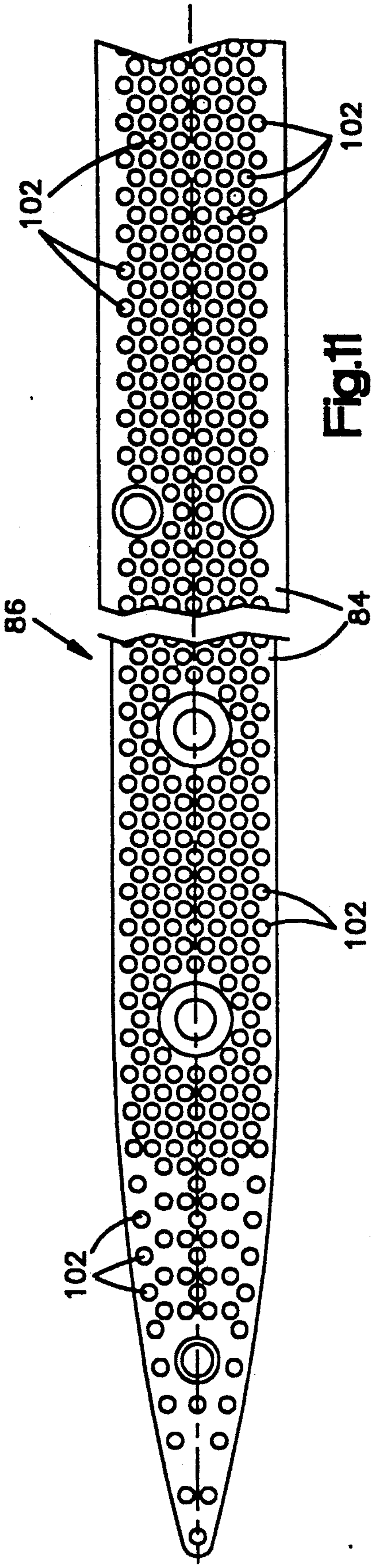
FIG. 11 is a fragmentary plan view, taken generally along the line 11—11 of FIG. 1, illustrating the construction of a portion of an upper side of the tape support.
Figure 12:
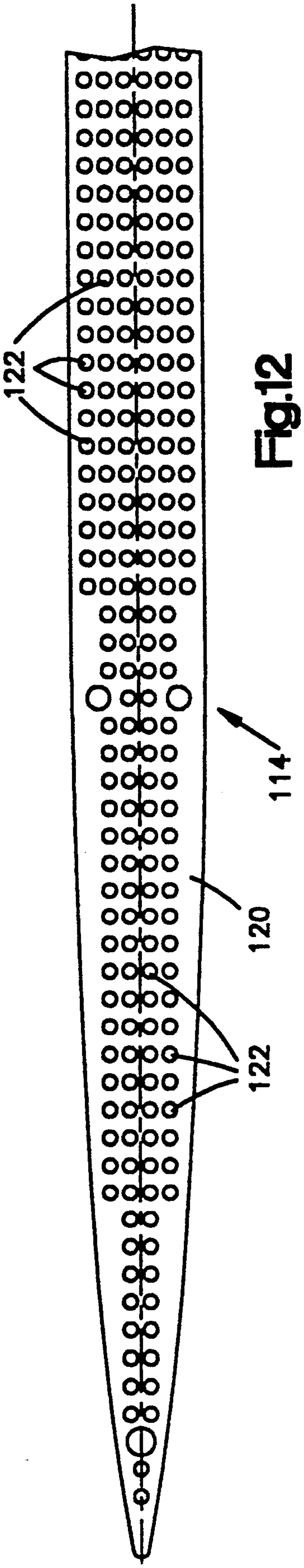
FIG. 12 is a fragmentary plan view, taken generally along the line 12—12 of FIG. 1, illustrating the construction of a lower side of the tape transfer manifold.

Once the predetermined length of tape has been positioned on the tape support 86, the tape 22 is cut to a desired length and configuration. Thus, the leading end portion of the tape 22 is cut to have a tapered nose or end portion with a configuration which matches the tapered configuration of the tape support 86 (FIG. 11). To provide the leading end of the tape 22 with a tapered or rounded configuration, a punch or trimmer 106 (FIGS. 4 and 6) has a cutting edge with a similar configuration. The cutting edge of the punch 106 cooperates with the tape support 86 to cut the leading end of the tape 22 to the desired configuration as the punch 106 is moved from the raised position of FIG. 4 to the lowered position of FIG. 5.

Simultaneously with trimming of the leading end portion of the tape 22 by the punch 106, a cutter or knife 110 (FIGS. 1 and 3) is lowered to cut the tape 22 at the right (as viewed in FIG. 1) end of the tape support 86. Thus, the knife 110 cooperates with the tape support 86 to cut the tape 22 with a square end.

Once the punch 106 and knife 110 have cut the tape 22, the gripper assembly 62 is moved forwardly from the end of feed position shown in dashed lines at 62*c* in FIG. 1 to a clear-die-area position shown in dashed lines at 62*d* in FIG. 1. This moves the gripper assembly 62 forwardly to a position in which it is clear of the area around the tape support 86. As the gripper assembly moves forwardly to the clear-die-area position 62*d*, a scrap leading portion of the tape 22 is separated from the predetermined cut length of tape disposed on the tape support 86. The scrap length held by the gripper assembly 62 will include the double layered leading end portion of the tape 22 and a single layered portion cut from the tape by the punch 106 during trimming of the leading end of the tape to a tapered configuration.

Figure 3:
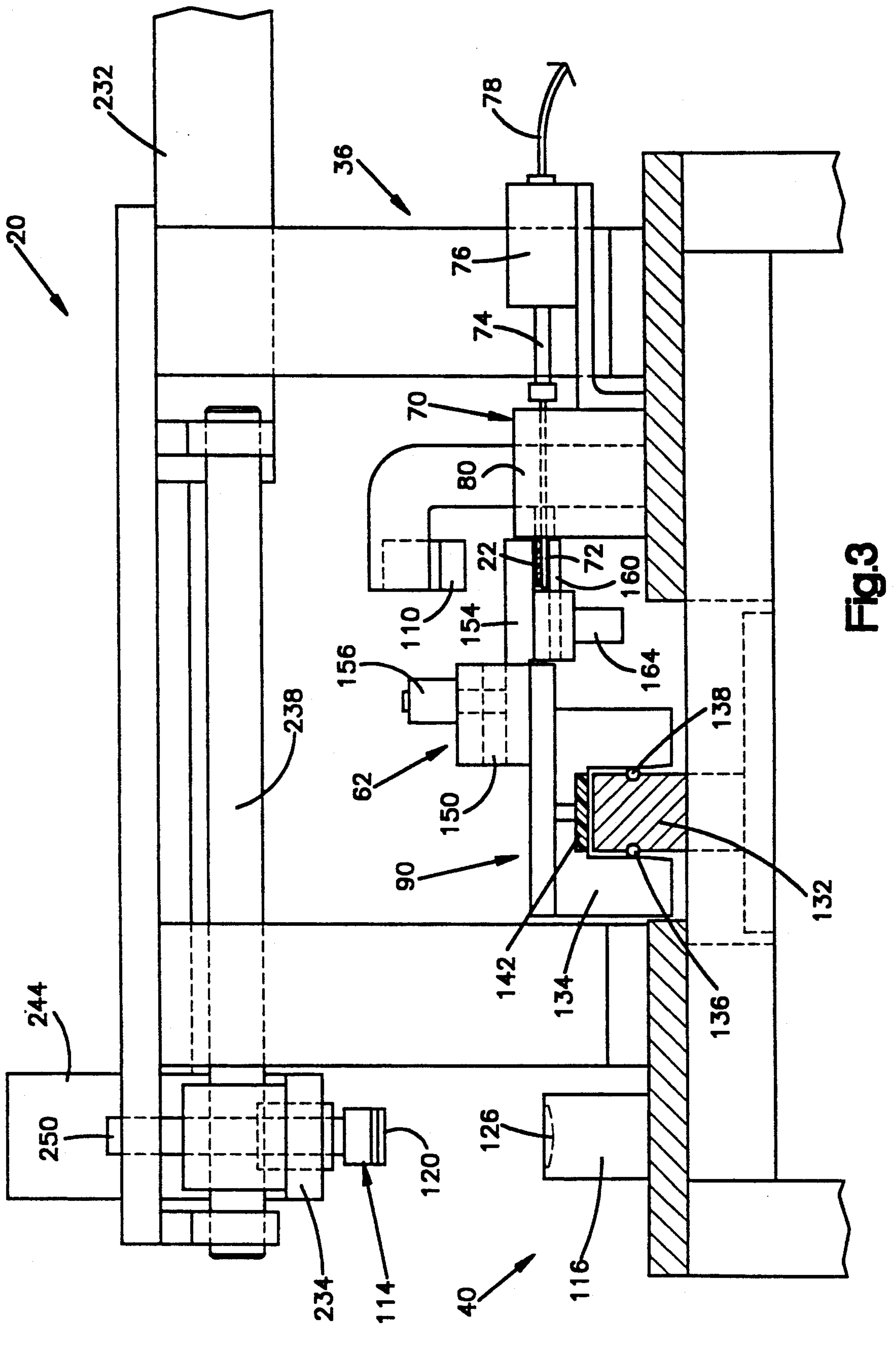
FIG. 3 is an elevational sectional view, taken generally along the line 3—3 of FIG. 2, illustrating the relationship between a pin for use in forming a double layered end portion on the tape, a gripper assembly which grips the double layered end portion of the tape, a drive assembly for moving the gripper assembly along a longitudinally extending tape support, a cutter for cutting an end portion of the tape, and a tape transfer manifold.
Figure 4:
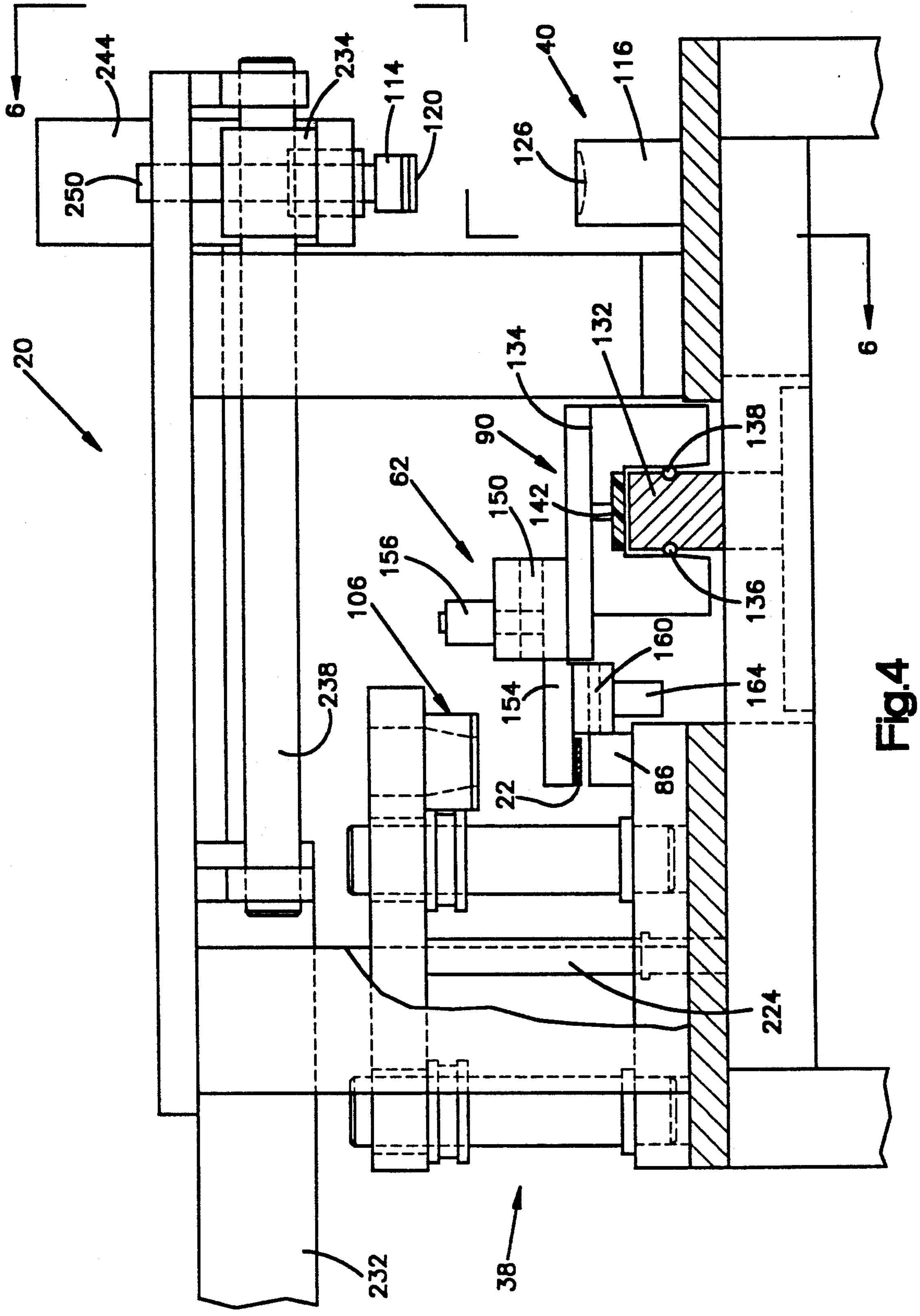
FIG. 4 is a sectional view, taken generally along the line 4—4 of FIG. 2, illustrating the relationship between the gripper assembly, the tape support, and a punch which trims a leading end portion of the tape, the punch being shown in a raised position.
Figure 5:
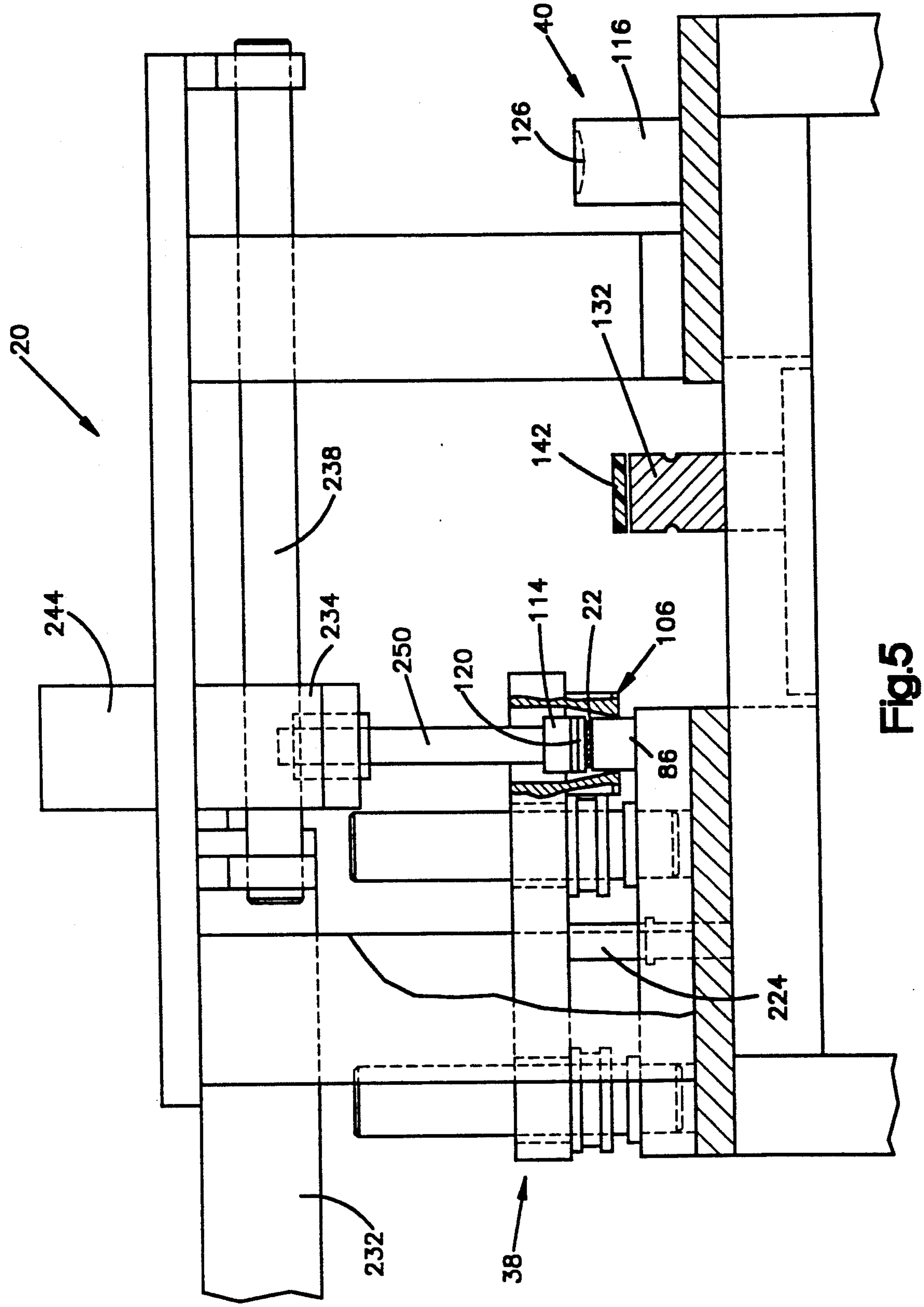
FIG. 5 is a sectional view, generally similar to FIG. 4, illustrating the punch in a lowered position after having trimmed the end portion of the tape and illustrating the tape transfer manifold in a lowered position engaging the trimmed tape.

An upper gripper or tape transfer manifold 114 is then moved from a position over an article support 116 at the applicator station 40 (FIGS. 3 and 4) to a position in which the tape transfer manifold 114 is disposed directly above the tape support 84 (FIGS. 2 and 5). During feeding of the tape 22 along the tape support 86 by the lower gripper assembly 62, the upper gripper or tape transfer manifold 114 was raised above an offset to one side of the tape support 86 in order to be well clear of the lower gripper assembly 62 (FIG. 4). Once the tape transfer manifold 114 has been moved into vertical alignment with the tape support 84, the tape transfer manifold is lowered to engage the upwardly facing backing side 24 of the tape 22 (FIG. 5). As the tape transfer manifold 114 is lowered, it moves into the punch 106 which remains in its lowered position after completing a trimming operation.

The downwardly facing lower side 120 (FIGS. 4, 5, 6 and 12) of the tape transfer manifold 114 abuttingly engages the upwardly facing backing side of the tape 22 (FIG. 5). The tape transfer manifold 114 has a length which corresponds to the length of the tape support 86 and a configuration which corresponds to the configuration of the tape support. Therefore, the tape transfer manifold 114 engages the cut length of tape disposed on the tape support 86 throughout the length of the tape.

The tape transfer manifold 114 utilizes suction to grip the upwardly facing backing side 24 of the cut tape 22 on the tape support 86. Thus, the tape transfer manifold 114 has a longitudinally extending manifold chamber (not shown) which is connected in fluid communication with a plurality of openings 122 (FIG. 12) formed in the lower side of the tape transfer manifold 114. Vacuum from a source of low pressure or vacuum pump is connected in fluid communication with the manifold chamber in the tape transfer manifold 114. This results in suction being applied to the upwardly facing backing side 24 of the piece of tape 22 disposed on the tape support 86 to enable the tape transfer manifold 114 to firmly grip the piece of tape.

Air under pressure is conducted to the manifold in the tape support 86. The air pressure conducted to the manifold chamber in the tape support 86 is transmitted through the openings 102 in the upper side 84 of the tape support 86 to the downwardly facing tacky side 26 of the tape 22. The air pressure applied against the downwardly facing tacky side 26 of the tape 22 pushes the tape upwardly away from the tape support 86 toward the tape transfer manifold 114. This positively disengages the tape 22 from the tape support 86 and presses the upwardly facing backing side 24 of the tape against the tape transfer manifold 114.

The upper side 84 of the tape support 86 has a non-stick coating. In addition, the upper side of the tape support 86 is formed with a linear array of small projections. The small projections may take the form of points formed by the intersection of chamfers for the openings 102. By forming the upper side 84 of the tape support 86 with a plurality of very small projections, the area of contact between the downwardly facing tacky side 26 of the tape 22 and the upper side 84 of the tape support 86 is minimized to minimize any tendency for the tape to adhere to the tape support.

Once the tape has been gripped by the tape transfer manifold 114 and released from the tape support 86, the tape transfer manifold is moved upwardly and then moved sidewardly from the delivery and cutting station 38 to the application station 40 (FIG. 4). At the application station 40, an elongated tape receiving member or article (not shown) is disposed in a recess or nest 126 formed in the article support 116. Once the tape transfer manifold 114 and cut length of tape have been moved into vertical alignment with the article in the recess 126 of the support 116, the tape transfer manifold 114 is lowered to press the downwardly facing tacky side 26 of the tape 22 against the upwardly facing side of the article in the recess 126.

The supply of vacuum or suction to the tape transfer manifold 114 is interrupted. The tape transfer manifold 114 is then moved upwardly to the raised position (FIG. 4). The cut length of tape 22 remains secured to the article in the recess 126. The raised tape transfer manifold 114 remains in the position shown in FIG. 4 over the tape support 116 at the application station 40 during the subsequent feeding of tape 22 along the tape support 86 in the manner previously described. By maintaining the tape transfer manifold 114 offset to one side of the tape support 86, any possibility of interference between the lower gripper assembly 62 and the tape transfer manifold 114 is eliminated.

After the cut length of tape has been applied to an article by the tape support 116 at the applicator station 40, the gripper assembly 62 is moved from the clear-die-area position 62*d* to an end of stroke position shown in dashed lines at 62*e* in FIG. 1. As the gripper assembly 62 moves from the clear-die-area position 62*d* to the end-of-stroke position 62*e*, the gripper assembly is in the open condition. A stripper bar projects into the open gripper assembly 62 to dislodge a scrap piece of tape from the gripper assembly.

The gripper assembly 62 is then moved upwardly to the raised position. The direction of operation of the gripper drive assembly 90 is reversed to move the raised gripper assembly 62 from the end-of-stroke position back to the initial position indicated in dashed lines at 62*a* in FIG. 2. The handling apparatus 20 is ready for a next succeeding cycle of operation.

It is preferred to apply the tape 22 directly to an article on the article support 116. However, the tape could be deposited at the application station 40, with the tacky side of the tape facing either up or down, to enable the tape to be subsequently applied to an article. If desired, the article could be moved to the tape 22 while the tape is still disposed on the tape support 86.

Gripper Assembly

The gripper assembly 62 is movable along a linear guide track 132 (FIGS. 3-5) which extends parallel to a longitudinal central axis of the tape support 86 and a longitudinal central axis of the article support 116 (FIG. 4). A gripper carriage 134 has rollers 136 and 138 (FIG. 3) which engage the track 132 to guide movement of the gripper carriage along the track. A toothed drive or timing belt 142 is fixedly connected to the carriage 134 and extends around a drive sprocket 144 and an idler sprocket 146. The drive sprocket 144 is driven by the motor 94 which operates in an open loop configuration. Although the gripper drive assembly 90 could have many different constructions, in one specific embodiment of the invention, the gripper drive assembly 90 was a "Linear Guide 14" which is commercially available from Item Products, Inc. of Houston, Texas and Canton, Michigan.

The gripper assembly 62 is mounted on the carriage 134. The gripper assembly 62 includes a base 150 (FIG. 3) which is fixedly connected to the upper side of the gripper carriage 134. An upper gripper jaw 154 extends outwardly from the base 150 toward the tape support 86. A piston and cylinder assembly 156 is mounted on the base 150 and is connected to the upper gripper jaw 154. The piston and cylinder assembly 156 is operable to move the upper gripper jaw 154 between the lowered position shown in FIGS. 3 and 4 and a raised position in which a lower jaw 160 of the gripper assembly 62 is well above the tape support 86.

A piston and cylinder assembly 164 is suspended from the upper gripper jaw 154 and is connected to the lower gripper jaw 160. The piston and cylinder assembly 164 is operable to move the lower gripper jaw toward and away from the upper gripper jaw 154 to operate the gripper assembly 62 between an open condition and a closed condition.

Operation of the piston and cylinder assembly 156 moves the upper gripper jaw 154, the lower gripper jaw 160 and the piston and cylinder assembly 164 from a lowered position to a raised position. When the upper and lower gripper jaws 154 and 160 are in the lowered position, the tape 22 is engageable with the tape support 86. When the upper and lower gripper jaws 154 and 160 are in the raised position, the tape 22 is disposed above and is spaced from the upper side surface 84 of the tape support 86.

Forming Double Layered End Portion of T&M

When the double layered end portion is to be formed by the tape 22, the downwardly facing tacky side 26 of the tape 22 engages and extends past the pin 72, that is toward the left as viewed in FIG. 7. The end portion of the stationary tape 22 is supported by engagement of the downwardly facing tacky side 26 of the tape with the lubricated cylindrical outer side surface of the pin 72. At this time, the open gripper assembly 62 is in the raised position in which the lower jaw 160 of the gripper assembly is disposed above the upwardly facing backing side 24 of the tape.

Figure 8:
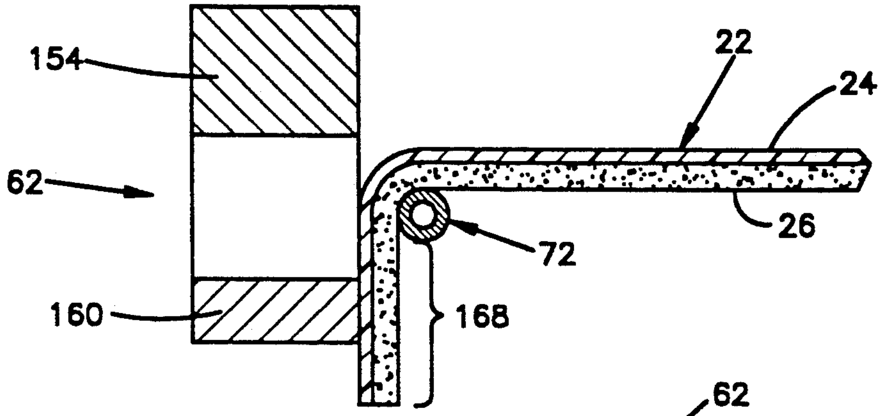
FIG. 8 is a schematic illustration depicting the manner in which the end portion of the tape is bent straight downwardly around the pin by the gripper assembly.

The piston and cylinder assembly 156 (FIG. 3) is then actuated to move the gripper assembly 62 from the raised position of FIG. 7 to the lowered position of FIG. 8. As the lower jaw 160 of the gripper assembly 62 moves downwardly, the backing side 24 of an end portion 168 of the tape 22 is engaged by the lower gripper jaw 160. As the lower gripper jaw 160 continues to move downwardly, the end portion of the tape 22 is bent around the pin 72. Thus, the end portion 168 of the tape 22 is deflected downwardly from the horizontal orientation of FIG. 7 to the vertical orientation of FIG. 8.

The gripper drive assembly 90 is then operated to move the open gripper assembly 62 in the reverse direction through a relatively short distance. As the gripper assembly 62 moves in the reverse direction, the end portion 168 of the tape is bent around the pin 72 from the vertical orientation of FIG. 8 to the horizontal orientation of FIG. 9. At this time, the backing side 24 on the end portion 168 of the tape faces downwardly and is engaged by an upwardly facing side surface of the lower gripper jaw 160. The lower side of the upper gripper jaw 154 of the gripper assembly is adjacent to the upwardly facing backing side 24 of the tape 22.

Figure 9:
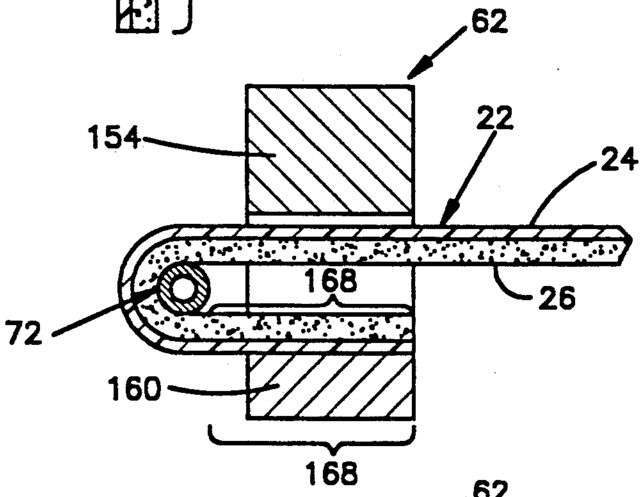
FIG. 9 is a schematic illustration depicting the manner in which the end portion of the tape is folded back along an adjacent portion of the tape by the gripper assembly.
Figure 10:
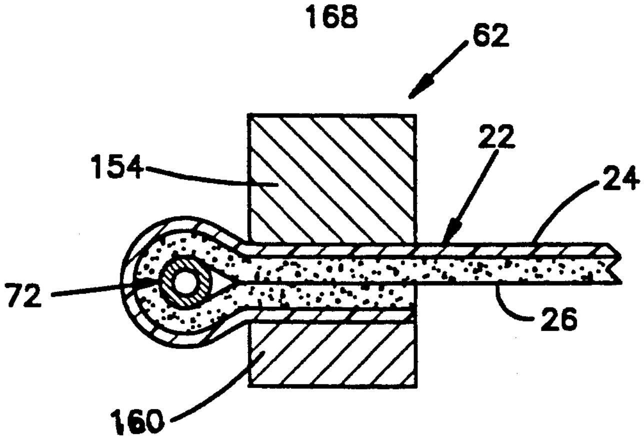
FIG. 10 is a schematic illustration depicting the manner in which the gripper assembly grips a double layered end portion of the tape.

When the gripper assembly 62 is operated from the open condition of FIG. 9 to the closed condition of FIG. 10, the tacky side 26 of the end portion 168 of the tape 22 is pressed against the tacky side 26 of the adjacent portion of the tape 22. This results in the formation of a double layered end portion on the tape 22. The backing side 24 of the tape 22 faces both upwardly and downwardly at the double layered end portion of the tape.

Once the gripper assembly 62 is closed (FIG. 10), the tacky sides 26 of the double layered portion of the tape are firmly pressed together. However, the upper and lower jaws 154 and 160 of the gripper assembly 62 only engage the relatively smooth backing side 24 of the tape 22. Therefore, there is little or no tendency for the tape 22 to adhere to the gripper assembly 62.

Once the double layered leading end portion has been formed on the tape 22 in the manner shown in FIG. 10, the pin assembly 70 (FIG. 2) is operated to the retracted condition to move the pin 72 out of engagement with the tape 22. Thus, the piston 76 (FIG. 2) and piston rod 74 are retracted. This moves the pin 72 axially away from the tape 22 to a retracted position in which the pin is spaced from the tape. The lubricant coating applied to the outside of the pin 72 enables it to be readily disengaged from the adhesive material around the pin (FIG. 10) as the pin is retracted.

Controls

Pneumatic controls 182 (FIG. 13) are operable to actuate the gripper assembly 62, to move the pin 72, to connect the tape support 86 with either suction or air pressure, to actuate the knife 110 and punch 106, to connect the tape transfer manifold 114 with suction, and to operate motors to transfer a predetermined length of tape from the tape support to the application station 40. The pneumatic controls 182 include a conduit 186 which is connected with a source of air under pressure and a reservoir or accumulator 188. The pneumatic controls 182 are connected with a vacuum pump 190 through a conduit 192 and a vacuum reservoir 194.

When a tape feed operating cycle is to be undertaken, the gripper assembly 62 is in the raised initial position 62*a* (FIG. 1) at the pickup station 36. At this time, the gripper assembly 62 is in the open condition. The pin 72 is extended to support an end portion of the tape 22 (FIG. 7). At the start of a tape feed operating cycle, the tape support 186 and tape transfer manifold 114 are both in an inactive condition in which they are not connected with either air under pressure or with vacuum. The tape transfer manifold 114 is in the raised position over the article support 116 at the application station 40 (FIG. 4). The punch or die 106 for trimming the leading end portion of the tape 22 is also in the raised position. In addition, the knife or cutter 110 is in the raised position of FIG. 3. The ink stamp assembly 66 is in a raised condition.

To initiate a tape feed operating cycle, the tape 22 is formed with a double layered leading end portion in the manner illustrated in FIGS. 7-10. Thus, a solenoid valve 200 (FIG. 13) is actuated to operate the piston and cylinder type motor 156 to move the gripper assembly 62 from the raised position of FIG. 7 to the lowered position of FIG. 8. As the gripper assembly 62 moves downwardly, the tape 22 is bent downwardly around the pin 72.

After the gripper drive assembly 90 has been operated to move the gripper assembly 62 rearwardly to the position shown in FIG. 9, the gripper assembly is operated to the closed condition. Thus, a solenoid valve 204 is actuated to operate the motor 164 to raise the lower jaw 160 of the gripper assembly 62. This clamps the double layered portion of the tape 22 between the upper and lower gripper jaws 154 and 160 (FIG. 10).

Once the gripper assembly 62 has been closed on the double layered leading end portion of the tape 22, the pin 72 is retracted. To retracted pin 72, a solenoid valve 206 is actuated to effect operation of the piston and cylinder type motor 76 connected with the hollow pin 72 (FIG. 3). Due to the coating of lubricant on the outside of the pin 72, actuation of the piston and cylinder type motor 76 can readily withdraw the pin from the double layered portion of the tape 22 even though the tacky side 26 of the tape is wrapped around the pin (FIG. 10).

Once the pin 72 has been retracted, the stamp assembly 66 is operated to stamp indicia on the upwardly facing backing side 24 of the tape 22. Thus, a solenoid valve 210 (FIG. 13) is actuated to direct high pressure air to a motor 212. This extends the motor 212 to operate the stamp assembly 66 (FIG. 1).

As the stamp assembly 66 is being operated, oil under pressure is forced through the conduit 78 and hollow piston rod 74 to the pin 72. The oil flows through openings in the cylindrical side of the pin 72 to grooves in the serrated bushing 80 to coat the pin. The solenoid valve 210 is then operated to retract the stamp assembly. At the same time, the flow of lubricant to the pin 72 is interrupted.

After the indicia has been applied to the tape 22 and the lubricant has been applied to the outside of the pin 72, the solenoid valve 200 is again operated to raise the gripper assembly 62. This raises the double layered end portion of the tape 22 above the upper side surface 84 of the tape support 86. Once the tape 22 has been raised, the solenoid valve 206 is again actuated to operate the motor 76 and extend the pin 72. This positions the lubricated pin 72 beneath the tape 22 with the pin at a lower level than the downwardly facing tacky side 26 of the tape.

The motor 94 (FIG. 2) in the tape drive assembly 90 is then energized to drive the belt 142 connected to the gripper assembly carriage 134. This moves the raised gripper assembly 62 from a position immediately rearwardly of the initial position shown at 62*a* in FIG. 2 to the end-of-feed position shown at 62*b* in FIG. 2. During movement of the gripper assembly 62 along the tape support 86, the downwardly facing tacky side 26 of the tape 22 is disposed above and is spaced from the upper side 84 of the tape support 86.

As the gripper assembly 62 moves toward the end-of-feed position 62*b*, the motor 58 (FIG. 2) in the tape feed assembly 52 is energized to drive the roller 54 at the same surface speed at which the gripper drive assembly 90 moves the gripper assembly 62. Therefore, the drive roller 54 (FIG. 1) in the tape feed assembly 52 feeds the tape from the reel 44 to the gripper assembly 62 to minimize tension in the portion of the tape 22 between the tape feed assembly 52 and gripper assembly 62.

Once the gripper assembly 62 has reached the end-of-feed position 62*b*, the gripper assembly is moved downwardly to the lowered position 62*c* (FIG. 1). To effect downward movement of the gripper assembly 62 to the lowered position 62*c*, the solenoid valve 200 (FIG. 13) is actuated to effect operation of the motor 156. The motor 156 moves the gripper assembly downwardly. As the gripper assembly 62 moves downwardly, the downwardly facing tacky side 26 of the tape moves toward the upwardly facing side 84 of the tape support 86.

As the tape 22 moves onto the upper side 84 of the tape support 86, a double acting solenoid valve 216 (FIG. 13) is actuated toward the left (as viewed in FIG. 13) to connect the vacuum pump 190 in fluid communication with the tape support 86. This results in the application of suction to the downwardly facing tacky side 26 of the tape 22. The suction applied to the tape 22 holds the tape in position on the tape support 86.

The punch or upper die 106 is then moved from the raised position of FIG. 4 to the lowered position of FIG. 5 to trim the leading end portion of the tape. Simultaneously therewith, the cutter or knife 110 is moved from the raised position of FIG. 3 to a lowered position to cut the tape 22 and separate the length of tape on the tape support 86 from the remainder of the tape. To initiate the cutting operation, a solenoid valve 220 (FIG. 13) is operated to direct high pressure fluid to operate a piston and cylinder assembly 222 connected with the punch or upper die 106 by a piston rod 224 (FIG. 4). Actuation of the piston and cylinder assembly 222 pulls the punch 106 downwardly to trim the leading end portion of the tape 22 (FIG. 5).

Simultaneously with operation of the motor 222 to lower the punch 106, a motor 226 is operated to lower the knife or cutter 110. Lowering the knife or cutter 110 cuts the tape 22 adjacent to the pickup station 36 to separate a predetermined length of the tape 22 from the remainder of the tape. The free end of the tape 22 connected with the reel 44 is supported by the extended pin 72 (FIG. 7).

Immediately after the tape 22 has been cut by the simultaneous operation of the motors 222 and 226 to lower the punch 106 and cutter 110, the gripper drive assembly 90 is operated to move the lowered gripper assembly from the end-of-feed position indicated at 62*c* in FIG. 1 to the clear-die-area position indicated at 62*d* in FIG. 1. As this is occurring, the double acting solenoid valve 216 (FIG. 13) is operated back to the illustrated closed condition to block fluid flow to and from the tape support 86. This interrupts the application of suction to the downwardly facing tacky side 26 of the tape 22. The predetermined length of tape 22 is then movable away from the tape support 86.

To effect movement of the tape away from the tape support 26, a solenoid valve 230 (FIG. 13) is operated to retract a transfer carriage motor 232. The transfer carriage motor 232 (FIGS. 2 and 3) is connected with a transfer carriage 234 (FIGS. 3, 4 and 6) upon which the tape transfer manifold 114 is mounted. Upon operation of the transfer carriage motor 232 to the retracted condition, the transfer carriage 234 is moved along horizontal support rods 238 from a position direction over the application station 40 (FIGS. 3 and 4) to a position directly over the tape support 86 (FIG. 5).

Figure 6:
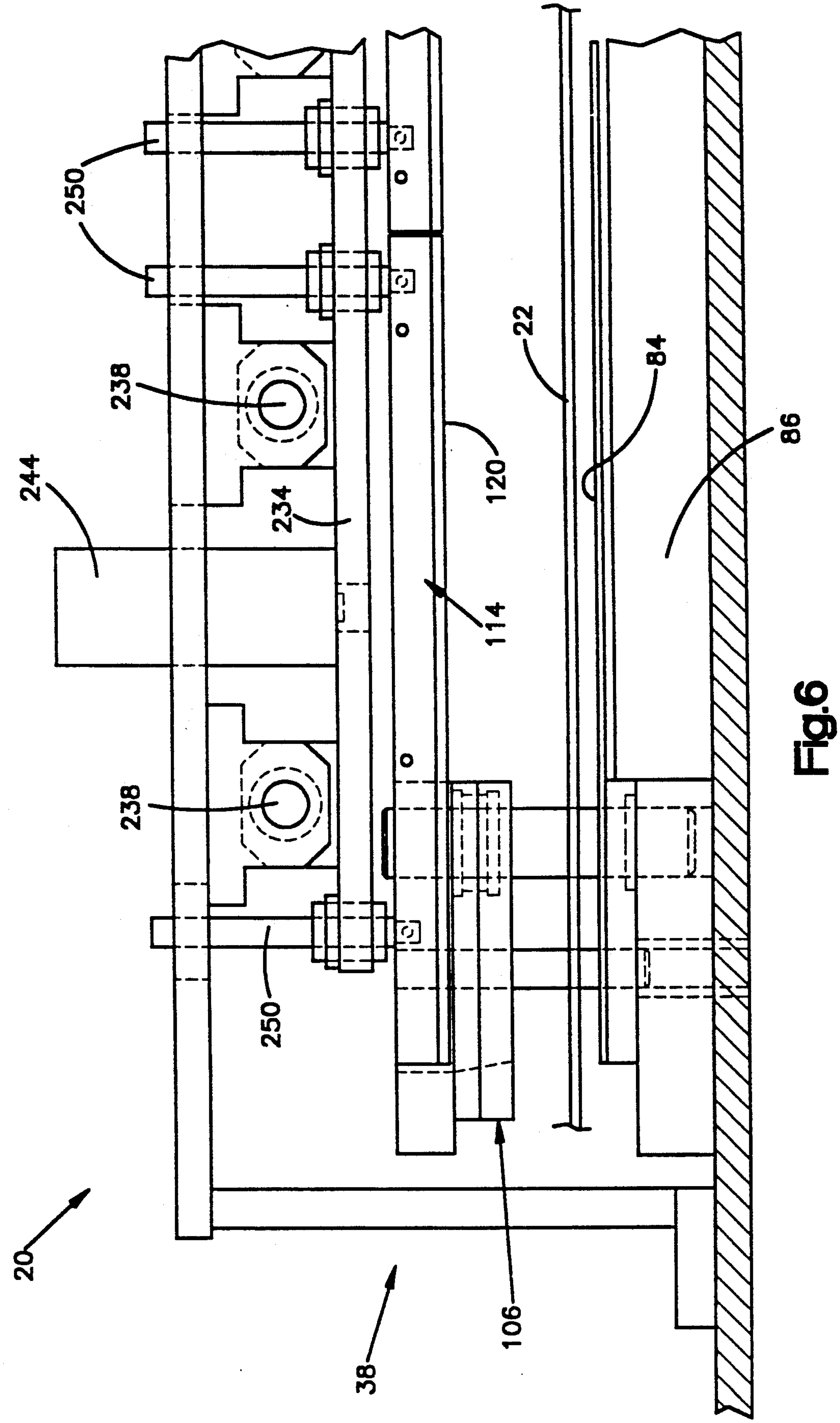
FIG. 6 is a sectional view, taken generally along the line 6—6 of FIG. 4, illustrating the construction of an apparatus for supporting and moving the tape transfer manifold.

Once the tape transfer manifold 114 has been moved into vertical alignment with the tape support 86 (FIG. 5), the tape transfer manifold 114 is lowered to engage the upwardly facing backing side 24 of the tape 22. To lower the tape manifold 114, a solenoid valve 242 (FIG. 13) is actuated to operate a pair of motors 244 to an extended condition. As the motors 244 are extended, the tape transfer manifold 114 is lowered. The downward movement of the tape transfer manifold 114 is guided by a plurality of vertically extending rods 250 (FIG. 6).

Once the tape transfer manifold 114 has engaged the upwardly facing backing side of the tape 22 (FIG. 5), a solenoid valve 254 (FIG. 13) is actuated to connect the vacuum pump 190 in fluid communication with the tape transfer manifold 114. This results in the application of suction or low pressure to the upwardly facing backing side 24 of the tape 22. The suction applied to the upwardly facing backing side 24 of the tape 22 enables the tape transfer manifold 114 to firmly grip the tape.

Simultaneously with actuation of the solenoid valve 254, the double acting solenoid valve 216 is actuated rightwardly (as viewed in FIG. 13) from its closed condition. This connects the air supply line 186 in fluid communication with the manifold chamber in the tape support 86. The resulting application of air pressure to the downwardly facing tacky side of the tape 22 pushes the tape away from the tape support 86..

Figure 13:
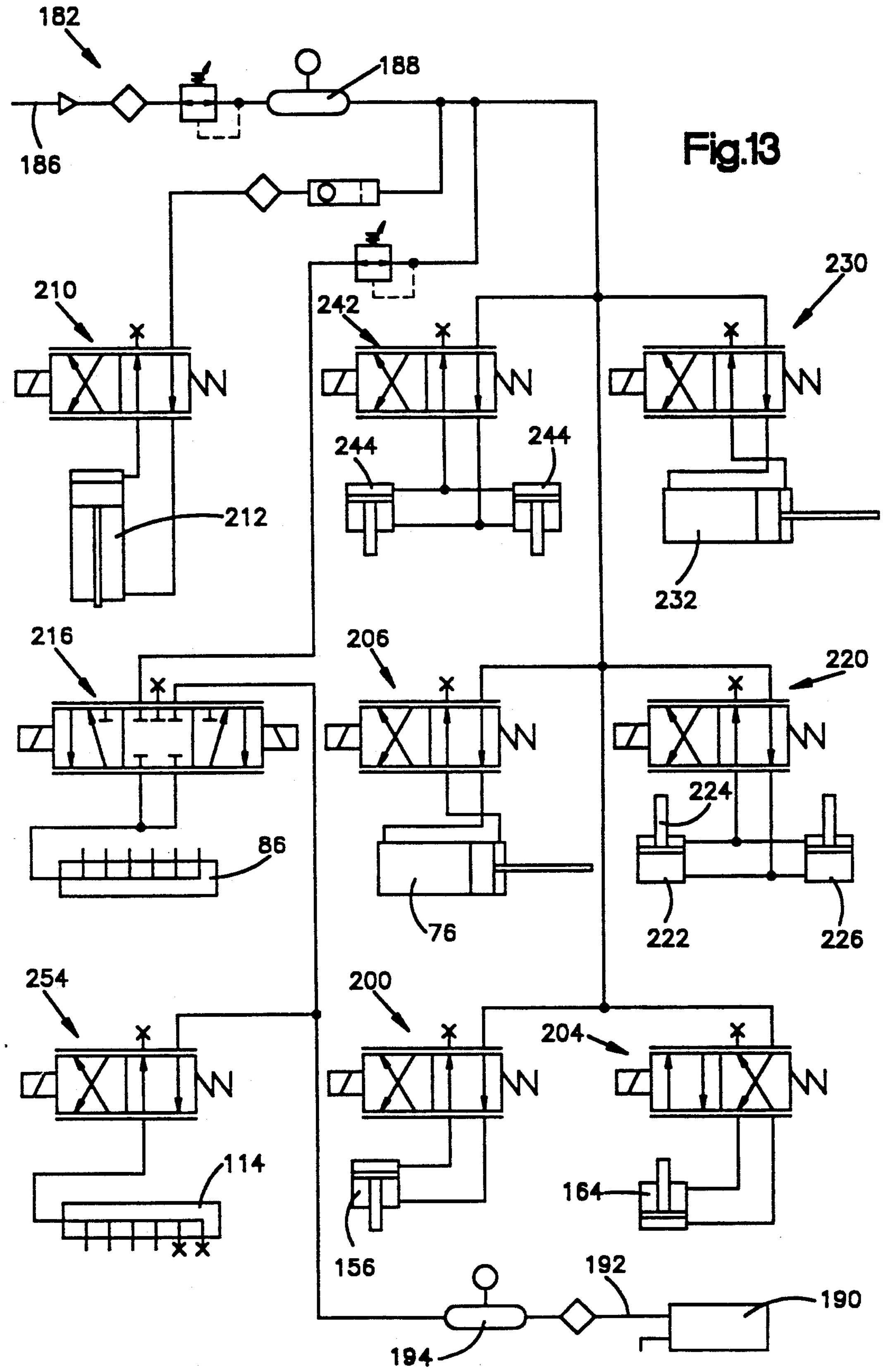
FIG. 13 is a schematic illustration of pneumatic circuitry used in association with the apparatus of FIGS. 1-12.

Once the predetermined length of tape 22 has been disengaged from the tape support 86 and has been firmly gripped by the tape transfer manifold 114, the solenoid valve 242 is operated to the unactuated condition shown in FIG. 13. This effects operation of the motors 244 and 246 to raise the tape transfer manifold 114 from the lowered position of FIG. 5. At this happens, a predetermined length of tape is lifted off of the tape support 86. As the predetermined length of tape is lifted off of the tape support 86, the solenoid valve 216 is actuated back to the closed condition shown in FIG. 13. This interrupts the flow of air to the manifold chamber in the tape support 86.

Once the tape transfer manifold 214 has been raised with the predetermined length of tape 22, the tape transfer carriage motor 232 is operated to move the transfer carriage 234 from a position over the tape support 86 to a position over the article support 116 (FIG. 4). Thus, the solenoid valve 230 is actuated back to the condition shown in FIG. 13 to extend the transfer carriage motor 232. This moves the tape transfer manifold 114 into vertical alignment with the article support 116 (FIG. 4).

The solenoid valve 242 is then actuated to operate the lift motors 244 and 246 to their extended conditions. As the motors 244 and 246 are extended, the tape transfer manifold 114 is lowered. As the tape transfer manifold 114 is lowered, the downwardly facing tacky side 26 of the predetermined length of tape 22 is pressed against the upwardly facing side of the article disposed on the support 116.

Simultaneously with the pressing of the tape against the article in the support 116, the valve 254 is actuated to disconnect the tape transfer manifold 114 from the vacuum pump 190. This interrupts the application of suction to the upwardly facing backing side 24 of the predetermined length of tape 22 to release the tape from the tape transfer manifold 114. Once the tape has been released from the tape transfer manifold 114, the valve 242 is again actuated to the condition shown in FIG. 13 to effect operation of the lift motors 244 and 246 to their retracted conditions. As this occurs, the tape transfer manifold 114 is lifted upwardly away from the article support 116, that is, to the raised position shown in FIG. 4.

Although it is preferred to utilize the tape transfer manifold 114 to apply the predetermined length of tape 22 directly to an article disposed on the support 116, it is contemplated that the tape transfer manifold 114 may be utilized to deposit the predetermined length of tape at a receiving location, that is, where the tape support 116 is located. The length of tape could then be manually applied to an article. If desired, the article could be applied to the tape 22 while the tape is on the support 116 with the tacky side 26 of the tape facing upwardly.

After the predetermined length of tape has been applied to an article, the scrap tape is removed from the gripper assembly 62. Thus, the valve 204 is actuated back to the condition shown in FIG. 13 to operate the gripper assembly 62 to its open condition. The valve 200 is also actuated back to the position shown in FIG. 13 to operate the motor 156 and to move the gripper assembly 62 to its raised condition. The tape drive assembly 90 is then operated to move the opened and raised gripper assembly 62 from the clear-die-area position shown in dashed lines at 62*d* in FIG. 1 to the end-of-stroke position shown at 62*e* in FIG. 1.

As the gripper assembly moves to the end-of-stroke position shown in dashed lines at 62*e* in FIG. 1, the open gripper assembly 62 moves past a stripper rod (not shown) which extends into the path of movement of the gripper assembly. This enables the stripper rod to knock the scrap leading end portion of tape from the gripper assembly 62. The tape drive assembly 90 is then operated to move the gripper assembly 62 back to the initial position indicated in dashed lines at 62*a* in FIG. 1. This positions the gripper assembly for the next succeeding cycle of operation.

Conclusion

An improved apparatus 20 for use in handling tape 22 having a backing side 24 and a tacky side 26 is operable to cut the tape into predetermined lengths. When a predetermined length of tape is to be removed from a reel 44 or other source of tape, an end portion 168 (FIG. 7) of the tape 22 is folded back around a pin 72 to form a double layered end portion (FIG. 10) with the backing side 24 of the tape facing both upwardly and downwardly. A gripper assembly grips 62 the double layered end portion of the tape 22. Since the backing side 24 of the tape 22 faces both upwardly and downwardly at the double layered end portion of the tape, the tape does not stick to the gripper assembly 62 even though the tape is firmly held by the gripper assembly.

The gripper assembly 62 is then moved along a longitudinally extending tape support 86. As the gripper assembly 62 moves along the tape support 86, a tape feed assembly 52 (FIGS. 1 and 2) feeds tape 22 toward the gripper assembly at the same speed as which the gripper assembly is moved along the tape support. By feeding tape toward the gripper assembly 62 with the tape feed assembly 52, tension in the portion of the tape between the gripper assembly and the tape feed assembly tends to be minimized. As the tape 22 is moved along the tape support 86 by the gripper assembly 62, the tacky side 26 of the tape faces downwardly toward the tape support and is disposed above the tape support.

When a predetermined length of tape 22 has been withdrawn from the source 44 of tape, the gripper assembly 62 is lowered to position the tape on the tape support 86. To hold the tape 22 in place, suction is applied to the downwardly facing tacky side 26 of the tape through openings 102 in the tape support 86 (FIG. 11). The tape 22 is then cut to a desired length.

After the tape 22 has been cut to the desired length, an upper gripper or tape transfer manifold 114 is lowered into engagement with the upwardly facing backing side 24 of the tape. Suction is applied to the backing side 24 of the tape 22 through openings 122 (FIG. 12) formed in the tape transfer manifold 114. At the same time, air under pressure is directed against the downwardly facing tacky side 26 of the tape 22 to positively release the tape from the tape support 86. The tape transfer manifold 114 is then raised and moved to a tape receiving location 40. At the tape receiving location 40, the tape transfer manifold 114 either applies the tape 22 directly to an article or releases the tape for subsequent application to a tape receiving article.

Having described the invention, the following is claimed:

1. An apparatus for use in handling tape having a backing side and a tacky side, said apparatus comprising first gripper means for gripping an end portion of the tape, a longitudinally extending tape support having an upwardly facing side, first gripper drive means for moving said first gripper means along said longitudinally extending tape support to withdraw at least a predetermined length of tape from a source of tape with the tacky side of the tape facing downwardly toward the upwardly facing side of said longitudinally extending tape support and with the backing side of the tape facing upwardly, cutter means for cutting the tape to separate at least the predetermined length of tape from tape at the source of tape, said cutter means being operable to cut the tape with the tacky side of the tape facing downwardly toward and engaging the upwardly facing side of said longitudinally extending tape support and with the backing side of the tape facing upwardly, second gripper means for gripping the predetermined length of tape while the tacky side of the predetermined length of tape is facing downwardly toward and engaging the upwardly facing side of said longitudinally extending tape support and while the backing side of the predetermined length of the tape is facing upwardly, and second gripper drive means for moving said second gripper means and the predetermined length of the tape away from said upwardly facing side of said longitudinally extending tape support.

2. An apparatus as set forth in claim 1 wherein said first gripper drive means is operable to move said first gripper means from a location adjacent to a first end portion of said longitudinally extending tape support to a location adjacent to a second end portion of said longitudinally extending tape support, said apparatus further including tape drive means disposed adjacent to the first end portion of said longitudinally extending tape support for feeding tape toward the second end portion of said longitudinally extending tape support as said first gripper drive means moves said first gripper means toward, the second end portion of said longitudinally extending tape support to tend to minimize tension in the tape.

3. An apparatus as set forth in claim 2 wherein said tape drive means includes a first roller means for engaging the downwardly facing tacky side of the tape, second roller means for engaging the upwardly facing backing side of the tape, and roller drive means for rotating at least one of said roller means at a surface speed which is the same as the speed of movement of said first gripper means along said longitudinally extending tape support by said first gripper drive means.

4. An apparatus as set forth in claim 1 wherein the upwardly facing side of said longitudinally extending tape support includes an array of small upwardly extending projections which are engaged by the tacky side of the tape during cutting of the tape by said cutter means.

5. An apparatus as set forth in claim 1 further including means for moving said first gripper means to deflect the tape and bend an end portion of the tape back along an adjacent portion of the tape to form a double layered end portion having the backing side of the tape facing upwardly and downwardly, said first gripper means being disposed in engagement with the double layered end portion of the tape during movement of said first gripper means along the longitudinally extending tape support by said first gripper drive means.

6. An apparatus as set forth in claim 1 further including a longitudinally extending pin member, means for applying lubricant to an outer side surface of said pin member, means for bending an end portion of the tape against said pin member with the tacky side of the tape in engagement with the lubricant coated outer side surface of said pin member to move a tacky side of the end portion of the tape against the tacky side of an adjacent portion of the tape to form a double layered end portion having the backing side of the tape facing upwardly and downwardly, and pin drive means for moving said pin member axially away from the double layered end portion of the tape by sliding the lubricant coated outer side surface of said pin member along the tacky sides of the double layered portion of the tape.

7. An apparatus as set forth in claim 6 wherein said means for bending an end portion of the tape against said pin member includes said first gripper means.

8. An apparatus as set forth in claim 1 wherein said second gripper means includes a longitudinally extending vacuum head for applying suction to the upwardly facing backing side of the predetermined length of the tape.

9. An apparatus as set forth in claim 8 wherein said second gripper drive means includes means for raising said vacuum head while said vacuum head is applying suction to the upwardly facing backing side of the predetermined length of tape to raise the predetermined length of tape upwardly off of said longitudinally extending tape support.

10. An apparatus as set forth in claim 9 further including means for applying fluid pressure, against the downwardly facing tacky side of the predetermined length of tape to facilitate raising of the predetermined length of tape upwardly off of the longitudinally extending tape support by said vacuum head.

11. An apparatus as set forth in claim 8 wherein said second gripper drive means includes means for moving said vacuum head along a path extending transversely to a longitudinal central axis of said longitudinally extending tape support to an application station, said second gripper drive means being operable to move said vacuum head to position the tacky side of the predetermined length of tape in engagement with an article at the application station.

12. An apparatus as set forth in claim 1 further including tape drive means for feeding tape from the source of tape toward said first gripper means as said first gripper means moves along the longitudinally extending tape support to tend to minimize tension in the predetermined length of tape.

13. An apparatus as set forth in claim 1 further including a longitudinally extending article support having a longitudinal central axis extending parallel to a longitudinal central axis of said longitudinally extending tape support, said second gripper drive means being operable to move said second gripper means along a path extending transversely to the longitudinal central axis of said article support to move the predetermined length of tape away from the longitudinally extending tape support to a position in which the predetermined length of tape is disposed over an article on said article support with the tacky side of the predetermined length of tape facing downwardly and for moving said second gripper means downwardly toward said article support to press the tacky side of the predetermined length of tape against an article disposed on said article support.

14. An apparatus as set forth in claim 13 wherein said first gripper drive means includes means for moving said first gripper means along a linear path having a longitudinal central axis disposed in a vertical plane located between said longitudinally extending tape support and said longitudinally extending article support.

15. An apparatus as set forth in claim 1 wherein said first gripper drive means is operable to move said first gripper means along said longitudinally extending tape support with the tacky side of the tape disposed above and spaced from said tape support.

16. An apparatus as set forth in claim 1 further including means for applying fluid pressure against the downwardly facing tacky side of the predetermined length of tape to facilitate moving the predetermined length of tape relative to the upwardly facing side of said longitudinally extending tape support.

17. An apparatus as set forth in claim 1 further including means for applying suction to the downwardly facing tacky side of the predetermined length of tape to pull the predetermined length of tape downwardly against the upwardly facing side of the longitudinally extending tape support.

18. An apparatus for use in handling tape having a backing side and a tacky side, said apparatus comprising tape feed means disposed adjacent to a first end portion of a path for feeding tape from a source of tape toward a second end portion of the path, tape engaging means for engaging an end portion of the tape adjacent to said tape feed means, and drive means for moving said tape engaging means away from said tape feed means toward the second end portion of the path at a speed which is the same as the speed at which tape is fed by said tape feed means to tend to minimize tension in the portion of the tape disposed between said tape feed means and said tape engaging means.

19. An apparatus as set forth in claim 18 wherein said tape-feed means includes a pair of rollers for engaging opposite sides of the tape and roller drive means for rotating at least one of said rollers at a surface speed which is the same as the speed of movement of said tape engaging means along the path.

20. An apparatus as set forth in claim 18 further including cutter means disposed adjacent to the first end portion of the path for cutting the tape to separate at least a predetermined length of tape from tape at the source of tape.

21. An apparatus as set forth in claim 18 wherein said tape engaging means includes gripper means for gripping the end portion of the tape with the tacky side of the tape facing downwardly, said drive means including means for moving said gripper means along the path with the tacky side of the tape facing downwardly.

22. An apparatus as set forth in claim 18 further including a tape support having an upwardly facing side surface and cutter means for cutting the tape to separate at least a predetermined length of tape from tape at the source of tape, said cutter means being operable to cut the tape with the tacky side of the tape facing downwardly toward and engaging the upwardly facing side of said tape support.

23. An apparatus as set forth in claim 22 further including second tape engaging means for gripping the predetermined length of tape while the tacky side of the predetermined length of tape is facing downwardly and engaging the upwardly facing side of said tape support and while the backing side of the predetermined length of tape is facing upwardly.

24. An apparatus as set forth in claim 18 further including a vacuum head extending-between the first and second end portions of the path for applying suction to the backing side of a length of tape which extends between the first and second end portions of the path, and vacuum head drive means for moving said vacuum head to an applicator station and for applying pressure against the backing side of the length of tape to press the tacky side of the length of tape against an article at the applicator station.

25. An apparatus as set forth in claim 18 further including means for bending an end portion of the tape back along an adjacent portion of the tape and to press the tacky Bide of the end portion of the tape against the tacky side of the adjacent portion of the tape to form a double layered end portion having the backing side of the tape facing upwardly and downwardly, said tape engaging means being disposed in engagement with the double layered end portion of the tape during movement of said tape engaging means along the path by said drive means.

26. An apparatus as set forth in claim 18 further including a longitudinally extending pin member, means for applying lubricant to an outer side surface of said pin member, means for bending an end portion of the tape against said pin member with the tacky side of the tape in engagement with the lubricant coated outer side surface of said pin member to move a tacky side of the end portion of the tape against the tacky side of an adjacent portion of the tape to form a double layered end portion having the backing side of the tape facing upwardly and downwardly, and pin drive means for moving said pin member axially away from the double layered end portion of the tape by sliding the lubricant coated outer side surface of said pin member along the tacky sides of the double layered portion of the tape.

27. An apparatus as set forth in claim 26 wherein said means moving said pin member axially away from the double layered end portion of the tape is disposed adjacent to the first end portion of the path and is operable to disengage said pin member from the double layered end portion of the tape prior to movement of said tape engaging means away from said tape feed means.

28. An apparatus for use in handling tape having a backing side and a tacky side, said apparatus comprising a longitudinally extending tape support, means for withdrawing a predetermined length of tape from a source of tape and for positioning the predetermined length of tape on said tape support, cutter means for cutting the tape to separate the predetermined length of tape from the source of tape while the predetermined length of tape is on said tape support, and means for engaging the predetermined length of tape while the predetermined length of tape is on said tape support and for moving the predetermined length of tape away from said tape support to a use location.

29. An apparatus as set forth in claim 28 wherein said means for engaging the predetermined length of tape and for moving the predetermined length of tape includes a vacuum head for applying suction to at least a portion of the predetermined length of tape and means for moving said vacuum head away from said tape support to the use location.

30. An apparatus as set forth in claim 29 wherein said means for moving said vacuum head away from said tape support includes means for pressing said vacuum head against the backing side of the predetermined length of tape to press the tacky side of the tape against an article at the use location.

31. An apparatus as set forth in claim 28 wherein said means for withdrawing a predetermined length of tape from a source of tape and for positioning the predetermined length of tape on said tape support includes tape feed means for feeding the predetermined length of tape with the tacky side of the tape facing downwardly and with the backing side of the tape facing upwardly.

32. An apparatus as set forth in claim 28 wherein said tape support includes an upwardly facing surface means for engaging the tacky side of the predetermined length of tape while said cutter means is cutting the tape.

33. An apparatus as set forth in claim 32 further including means for applying fluid pressure against the downwardly facing tacky side of the predetermined length of tape to facilitate moving the predetermined length of tape away from said tape support.

34. An apparatus as set forth in claim 28 wherein said means for withdrawing a predetermined length of tape from a source of tape and for positioning the predetermined length of tape on said tape support includes gripper means for engaging an end portion of the tape and gripper drive means for moving said gripper means along said tape support with the tape disposed above said tape support.

35. An apparatus as set forth in claim 28 wherein said means for withdrawing a predetermined length of tape from a source of tape and for positioning the predetermined length of tape on said tape support includes tape feed means disposed adjacent to a first end portion of said tape support for feeding tape from a source of tape toward a second end portion of said tape support, tape engaging means for engaging an end portion of the tape adjacent to said tape feed means, and drive means for moving said tape engaging means away from said tape feed means toward the second end portion of said tape support at a speed which is the same as the speed at which tape is fed by said tape feed means to tend to minimize tension in the portion of the tape disposed between said tape feed means and said tape engaging means.

36. An apparatus as set forth in claim 35 wherein said tape feed means includes a plurality of rollers for engaging opposite sides of the tape and roller drive means for rotating at least one of said rollers at a surface speed which is the same as the speed of movement of said tape feed means toward the second end portion of said tape support.

37. An apparatus as set forth in claim 28 wherein an upwardly facing side of said longitudinally extending tape support includes an array of small upwardly extending projections which are engaged by the tacky side of the tape during cutting of the tape by said cutter means.

38. An apparatus as set forth in claim 28 wherein said means for withdrawing a predetermined length of tape from a source of tape and for positioning the predetermined length of tape on said tape support includes means for bending an end portion of the tape back along an adjacent portion of the tape and for pressing the tacky side of the end portion of the tape against the tacky side of the adjacent portion of the tape to form a double layered end portion having the backing side of the tape facing upwardly and downwardly and means for engaging the double layered end portion of the tape during withdrawal of the predetermined length of tape from the source of tape.

39. An apparatus as set forth in claim 28 wherein said means for withdrawing a predetermined length of tape from the source of tape includes a longitudinally extending pin member, means for applying lubricant to an outer side surface of said pin member, and means for bending an end portion of the tape against said pin member with the tacky side of the tape in engagement with the lubricant coated outer side surface of said pin member to move a tacky side of the end portion of the tape against the tacky side of an adjacent portion of the tape to form a double layered end portion having the backing side of the tape facing upwardly and downwardly.

40. An apparatus as set forth in claim 39 wherein said means for withdrawing a predetermined length of tape from the source of tape further includes gripper means for gripping the double layered end portion of the tape.

41. An apparatus as set forth in claim 40 wherein said means for bending an end portion of the tape against said pin member includes means for moving said gripper means relative to said pin member to engage the end portion of the tape.

42. An apparatus as set forth in claim 28 further including a longitudinally extending article support disposed at the use location and having a longitudinal central axis extending parallel to a longitudinal central axis of said longitudinally extending tape support, said means for engaging the predetermined length of tape and for moving the predetermined length of tape away from the tape support to the use location including means for moving the predetermined length of tape along a path extending transversely to the longitudinal central axis of said article support to move the predetermined length of tape away from the longitudinally extending tape support to a position in which the predetermined length of tape is disposed adjacent to an article on said article support.

43. An apparatus as set forth in claim 28 further including means for applying suction to the tape to pull the tacky side of the tape against said tape support and for applying fluid pressure against the tacky side of the tape to facilitate disengagement of the tape from said tape support.

44. An apparatus for use in handling tape having a backing side and a tacky side, said apparatus comprising a longitudinally extending tape support, means for withdrawing a predetermined length of tape from a source of tape with the tacky side of the tape facing downwardly and for positioning the predetermined length of tape on said tape support with the tacky side of the tape facing downwardly, cutter means for cutting the tape to separate the predetermined length of tape from the source of tape while the predetermined length of tape is on said tape support with the tacky side of the tape facing downwardly toward and engaging said tape support, and means for applying fluid pressure against the tacky side of the tape after cutting of the tape by said cutter means to facilitate disengagement of the tape from said tape support.

45. An apparatus as set forth in claim 44 further including means for applying suction against the tacky side of the tape prior to cutting of the tape by said cutter means to pull the tacky side of the tape against said tape support.

46. An apparatus asset forth in claim 44 further including means for engaging the backing side of the predetermined length of tape while the predetermined length of tape is on said tape support and for moving the predetermined length of tape away from said tape support to a use location.

47. An apparatus as set forth in claim 46 wherein said means for engaging the backing side of the predetermined length of tape and for moving the predetermined length of tape includes a vacuum head for applying suction to at least a portion of the backing side of the predetermined length of tape and means for moving said vacuum head away from said tape support to the use location.

48. An apparatus as set forth in claim 47 wherein said means for moving said vacuum head away from said tape support includes means for pressing said vacuum head against the backing side of the predetermined length of tape to press the tacky side of the tape against an article at the use location.

49. An apparatus as set forth in claim 44 wherein said means for withdrawing a predetermined length of tape from a source of tape and for positioning the predetermined length of tape on said tape support includes first gripper means for gripping an end portion of the tape, first gripper drive means for moving said first gripper means along said longitudinally extending tape support, said apparatus further including second gripper means for gripping the predetermined length of tape while the tacky side of the predetermined length of tape is facing downwardly toward and engaging said tape support and while the backing side of the predetermined length of tape is facing upwardly, and second gripper drive means for moving said second gripper means and the predetermined length of tape away from said longitudinally extending tape support.

50. An apparatus as set forth in claim 49 further including tape feed means for feeding tape toward said first gripper means with the tacky side of the tape facing downwardly and with the backing side of the tape facing upwardly.

* * * * *